United States Patent [19]
Reed et al.

[11] Patent Number: 5,386,729
[45] Date of Patent: Feb. 7, 1995

[54] TEMPERATURE COMPENSATED MICROBEND FIBER OPTIC DIFFERENTIAL PRESSURE TRANSDUCER

[75] Inventors: Stuart E. Reed, Homeworth, Ohio; John W. Holman, Jamestown, Pa.; John W. Berthold, Salem, Ohio

[73] Assignee: The Babcock & Wilcox Company, New Orleans, La.

[21] Appl. No.: 124,894

[22] Filed: Sep. 22, 1993

[51] Int. Cl.$^6$ .............................................. G01L 13/02
[52] U.S. Cl. ........................................ 73/705; 73/708; 73/717; 250/227.16; 250/231.19
[58] Field of Search ...................... 250/227.16, 231.19; 73/705, 708, 717, 716, 715, 718

[56] References Cited

U.S. PATENT DOCUMENTS

| | | | |
|---|---|---|---|
| 3,714,829 | 2/1973 | Gilbert | 73/398 R |
| 3,822,596 | 7/1974 | Bonner | 73/716 |
| 4,091,682 | 5/1978 | Abbott et al. | 73/717 X |
| 4,270,050 | 5/1981 | Brogardh | 250/231 R |
| 4,470,310 | 9/1984 | Tsuruoka et al. | 73/861.24 |
| 4,620,093 | 10/1986 | Barkhoudarian et al. | 250/231 P |
| 4,632,563 | 12/1986 | Lord, III | 356/437 |
| 4,648,280 | 3/1987 | Miyoshi et al. | 73/861.24 |
| 4,679,425 | 7/1987 | Bolland | 73/49.2 |
| 4,743,752 | 5/1988 | Olsen et al. | 250/227 |
| 4,746,218 | 5/1988 | Lord, III | 356/437 |
| 4,752,141 | 6/1988 | Sun et al. | 374/161 |
| 4,883,354 | 11/1989 | Sun et al. | 356/128 |
| 4,905,575 | 3/1990 | Knecht et al. | 73/718 X |
| 4,918,305 | 4/1990 | Wlodarczyk et al. | 250/231.19 X |
| 4,932,262 | 6/1990 | Wlodarczyk | 73/705 |
| 4,932,263 | 6/1990 | Wlodarezyk | 73/705 |
| 4,988,212 | 1/1991 | Sun et al. | 374/161 |
| 4,991,178 | 2/1991 | Wani et al. | 372/32 |
| 5,020,379 | 6/1991 | Berthold et al. | 73/800 |
| 5,025,667 | 6/1991 | Strasser | 73/718 X |
| 5,061,846 | 10/1991 | Gergely | 250/227.14 |
| 5,090,254 | 2/1992 | Guckel et al. | 73/862.59 |
| 5,144,375 | 9/1992 | Gabriel et al. | 356/345 |
| 5,188,983 | 2/1993 | Guckel et al. | 437/209 |
| 5,191,791 | 3/1993 | Gerardi et al. | 73/178 R |
| 5,196,694 | 3/1993 | Berthold et al. | 250/227.16 |
| 5,206,455 | 4/1993 | Williams et al. | 102/201 |

OTHER PUBLICATIONS

"Electronic Gage & Absolute Pressure Transmitter," Bailey Control Systems, Prod. Spec. E41-18-1 (Admitted Prior Art).

Model 1151DP Alphaline Differential Pressure Transmitter, Rosemount Inc. (Admitted Prior Art).

Smart Vortex Shedding Flowmeter, Type VF, Bailey Controls, Prod. Spec. E 22-35-10.

CRD Proposal No. 92-202, submitted to Electric Power Research Institute on Nov. 13, 1992, titled "Advanced Pressure, Level, and Flow Sensors".

*Primary Examiner*—Ricahrd E. Chilcot, Jr.
*Assistant Examiner*—Joseph L. Felber
*Attorney, Agent, or Firm*—Daniel S. Kalka; Robert J. Edwards

[57] ABSTRACT

A differential pressure transducer cell comprises a housing and a pair of spaced diaphragms connected at one end to one portion of the housing and connected at an opposite end to a second portion of the housing. The diaphragms have an outer surface and an inner surface; and the outer surface of each diaphragm is exposed to a pressure. A beam is connected between the diaphragms at the inner surface of the diaphragms. Sensors are also provided on the beam.

13 Claims, 9 Drawing Sheets

Microbend Displacement Sensor

Microbend Reference Sensor

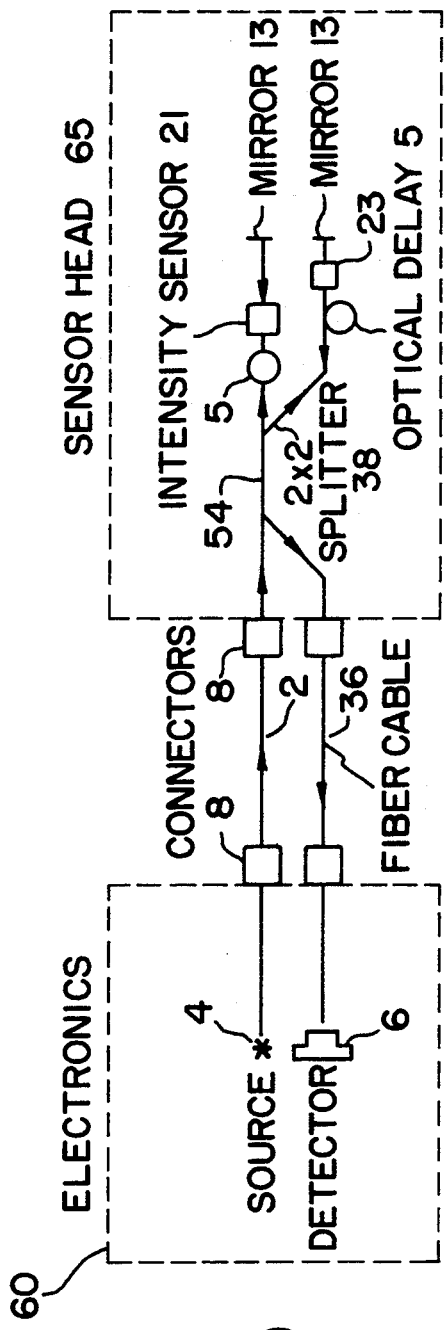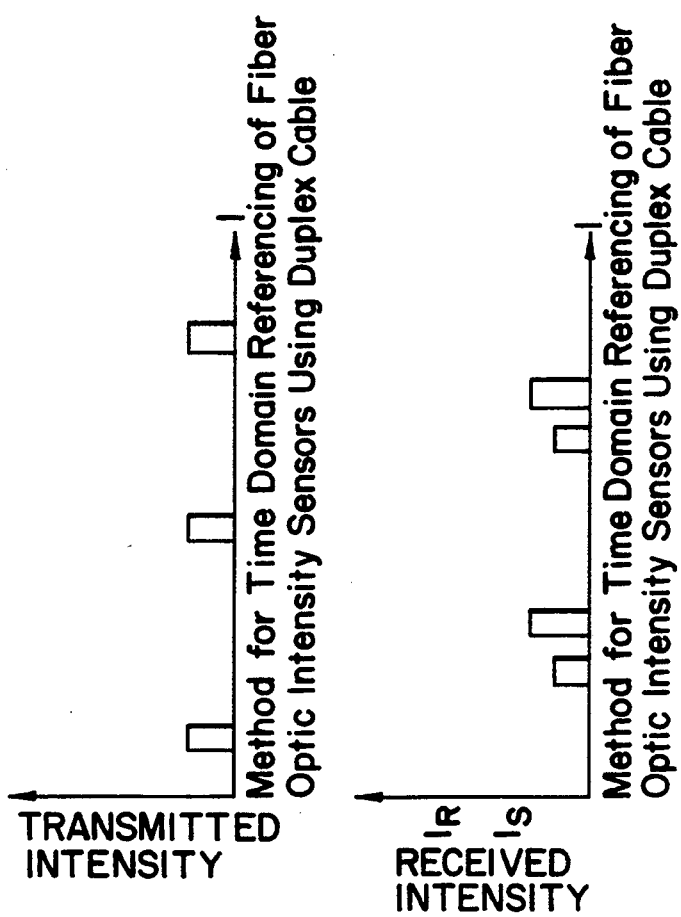
FIG.10
FIG.11
FIG.12

TEMPERATURE COMPENSATED MICROBEND FIBER OPTIC DIFFERENTIAL PRESSURE TRANSDUCER

BACKGROUND OF THE INVENTION

1. Field of the Invention

The present invention relates in general to differential pressure transducers and in particular to a new and useful differential pressure transducer using a rigid beam.

2. Description of the Related Art

Presently, differential pressure (dP) transducers generally contain a displacement sensor coupled between two thin diaphragms. The two coupled diaphragms perform a mechanical subtraction of the pressures on them and the sensor measures their net motion relative to the transducer body to determine differential pressure. In order to prevent diaphragm rupture while maintaining the desired sensitivity to differential pressure, the volume between the diaphragms, including the sensor, is filled with a hydraulic fill fluid. When process line pressure is presented to one side of each diaphragm, the fill fluid is pressurized to the line pressure. If the boundary of the volume between the diaphragms, including the diaphragms, electrical feedthroughs and fill/bleed ports, is not totally sealed small leaks of fill fluid will occur and will cause unacceptable increases in response time, sensor output drift and transducer non-linearity with pressure. In some cases, these changes may not be readily detected when the transducer is in service because the transducer output may remain stable at constant dP. The leaking of fill fluid from these known dP transducers is a problem which is well documented.

Another inadequacy of fluid-filled dP transducers is the static pressure effect. A dP transducer as described should output a value of zero when the same process pressure is applied to both diaphragms. However, the static pressure causes the fill fluid to be pressurized, resulting in distortions of the transducer body. These distortions cause relative motions between the diaphragms and body resulting in static pressure effect on zero, and also produce radial forces on the diaphragms which change their effective stiffness and cause static pressure effects on span. In addition, the displacement sensor is exposed to the fill-fluid pressure environment adding to the static pressure effects on both zero and span. In applications involving static pressures of several thousand psig or greater, the requirement for a stable zero and span over the allowable range of static pressures is difficult to achieve in practice.

The use of a fill fluid also contributes to degraded performance of a dP transducer when it is operated over a range of temperatures, as is normal in service. The volumetric expansion of liquids with temperature is significantly greater than that of the metals used in construction of the transducer body. Thus, when the temperature of the transducer changes, the volume of the fill fluid changes more than the volume of the body. This results in motion of both the thin diaphragms away from their rest positions, distorting their shape and causing degraded linearity and accuracy. The normal means for limiting this effect is to keep the volume of the fill fluid at an absolute minimum; this means aggravates the effect of leakage because a leak of a given volume is a more significant part of the total fluid volume.

Rather than perform a mechanical subtraction of two large pressures as described above, an alternative approach would be to measure each pressure with a separate gage pressure transducer and then subtract the signals electronically. If the full-scale differential pressure range to be measured is 1000 in $H_2O$ (37 psi) and the desired accuracy is 0.1% FSI (0.04 psi), then for application at 3000 psig line pressure, a gage pressure transducer is required which has an accuracy of 0.04/3000=0.0013% (1:75,000). Such devices are not commercially available, and not yet achieved with any known technology. Thus, mechanical subtraction of two large pressures is the only alternative measurement approach available with present day technology.

Presently, there is no known system or method for providing a differential pressure transducer which avoids the problems associated with the known devices listed above.

SUMMARY OF THE INVENTION

The present invention pertains to a differential pressure transducer having a cell which comprises a housing and a pair of spaced diaphragms connected at one end to one portion of the housing and at an opposite end to a second portion of the housing. The diaphragms have an outer surface and an inner surface and the outer surface of each diaphragm is exposed to a pressure. A rigid beam is connected between the diaphragms at their inner surfaces. A displacement sensor and a reference sensor are used in conjunction with the rigid beam for sensing changes in the beam displacement which is proportional to the differential pressure between the diaphragms.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 10 is a schematic view of a fiber optic microbend sensor system used in conjunction with the present invention;

FIG. 11 is a graph plotting transmitted intensity versus time for the system of FIG. 10;

FIG. 12 is a graph plotting the received intensity versus time for the system of FIG. 10.

DESCRIPTION OF THE PREFERRED EMBODIMENTS

Figure 1:
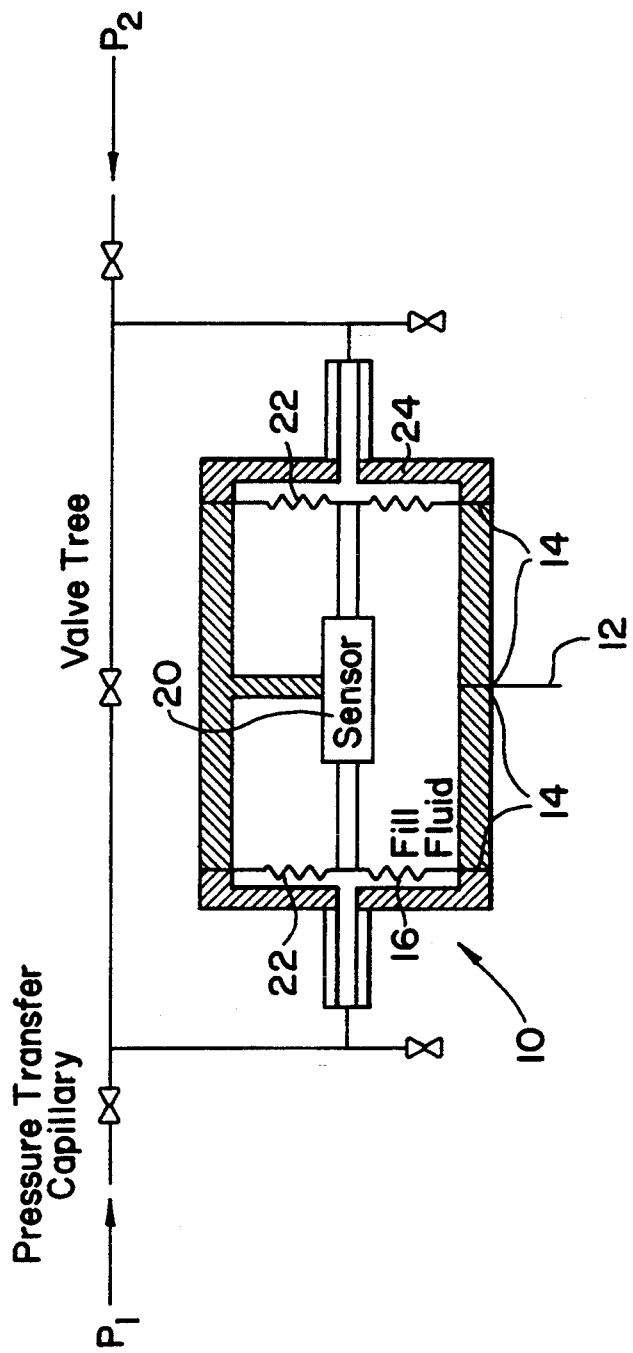
FIG. 1 is a schematic view illustrating a first known differential pressure transducer.

Fig. 1 illustrates a first known differential pressure transducer having a differential pressure cell 10 comprising two spaced diaphragms 22 connected to a housing by seals 14. Fill fluid 16 and a sensor 20 are contained between the diaphragms 22 as well as a sensor lead wire 12. Diaphragm stops 24 are employed outside of the diaphragms 22.

Figure 2:
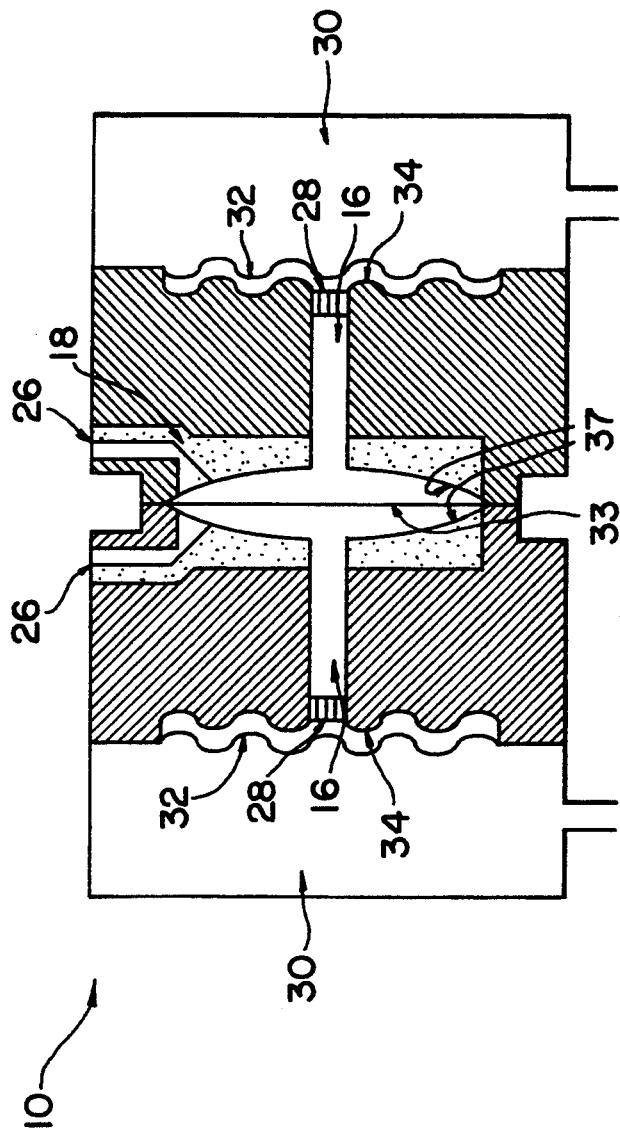
FIG. 2 is a schematic view of a second known differential pressure transducer.

FIG. 2 illustrates a second known transducer which is also a fluid-filled differential pressure transducer. The welded assembly 10 comprises isolation diaphragms 32, sensing diaphragm 33, fill fluid 16, and lead wires, which are also the high- and low-pressure fill tubes 26. The measured change in capacitance between the sensing diaphragm 33 and high and low pressure metallized surfaces 37 is directly proportional to the pressure difference across the transducer 10. The cell further comprises process chambers 30 spaced away from convolution pressure plates 34. Electrical insulator 18 is also provided as well as ceramic inserts 28.

The fill tube penetrations 26 are the locations most likely to leak fill fluid over time. The pressure on the fill fluid 16 is nominally 3000 psi at operating pressure. If the fill tube diameters 26 are kept small, the force acting on the fluid 16 to push it out of the fill tube penetrations 26 will also be small. Nevertheless, a good seal is difficult to maintain. Fill fluid leaks are also possible between the outside diameter of the fill tube 26 and the glass insulating material 18, and along the boundaries between the insulating material 18 and metal housing 11. Thus, it is very difficult to make a totally leak-tight seal, since penetrations through the high pressure boundary must be made.

The present invention provides an alternative to the use of the fill fluid transducers as shown in Figs. 1 and 2. The present invention comprises a rigid beam 40, which can be puck-shaped, connected between spaced circular diaphragms 44 at the center of each diaphragm 44 to mechanically couple the diaphragms 44 and react to static pressure forces. The diaphragms 44 between the beam 40 and the attachment to the housing 42 permits the diaphragms 44 to deflect elastically when exposed to differential pressure. The diaphragms 44 constitute the pressure boundary; the volume between the diaphragms 44 within the housing 42 is unpressurized.

The present invention provides diaphragms 44 which are sized to operate elastically but with sufficient deflection for the measurement of differential pressure. The housing 42 can be designed to act as a secondary pressure boundary in the event of diaphragm rupture providing redundancy which is beneficial in some applications. Differential pressure cause axial motion of the beam 40 connecting the diaphragms 44. The motion can be readily measured to high precision with sensitive fiber-optic displacement sensors which will be described later. It is not necessary to make any penetrations through the pressure boundary for lead wires or fill fluid tubes which are commonly found in the known devices. Because there is no fill fluid used in the transducer, potential leakage of the transducer and the consequent performance degradation are eliminated. This invention provides for the transducer cavity to be unpressurized, eliminating the contributions to the static pressure effect from the pressure distortion of the housing and the pressure effects on the sensor capsule itself. The thermal performance of the transducer is improved because the effect of the volumetric expansion of the fill fluid is eliminated; the thermal expansion of the beam 40 can be readily matched to that of the housing 42.

A diaphragm stop 48 is provided near the outer sides of each diaphragm 44. Each diaphragm 44 is connected to the housing 42 by welds 46 which seal the cell. The rigid beam 40 can be various lengths, but preferably the beam 40 has a length which is approximately 0.3 inches.

Figure 3:
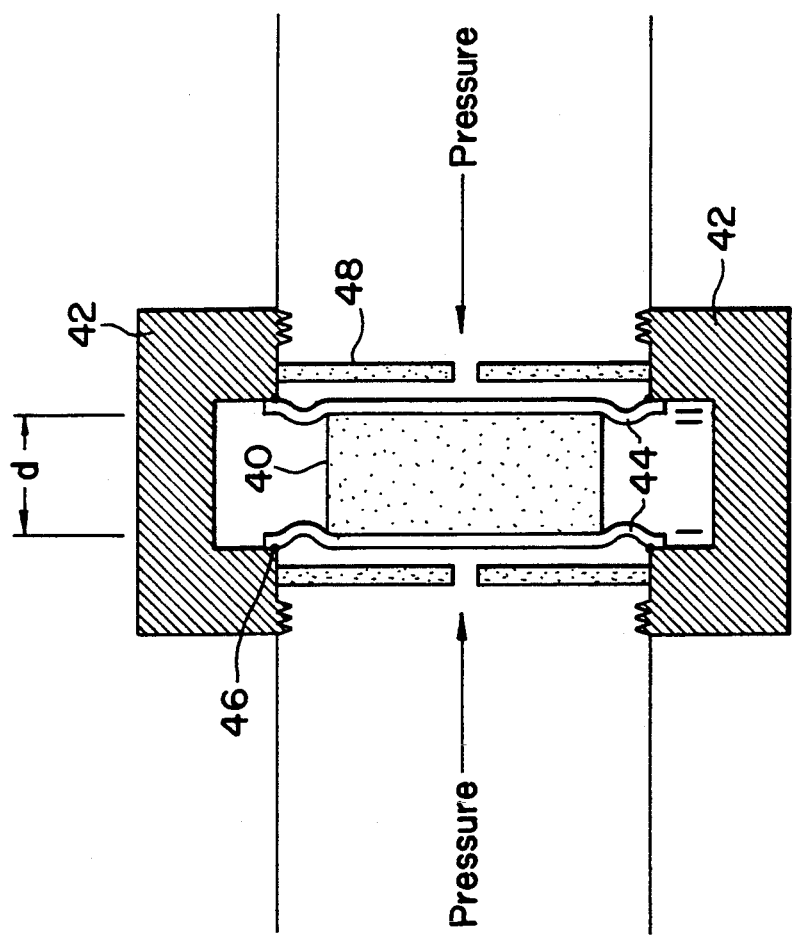
FIG. 3 is a schematic view of a differential pressure transducer according to the present invention.
Figure 4:
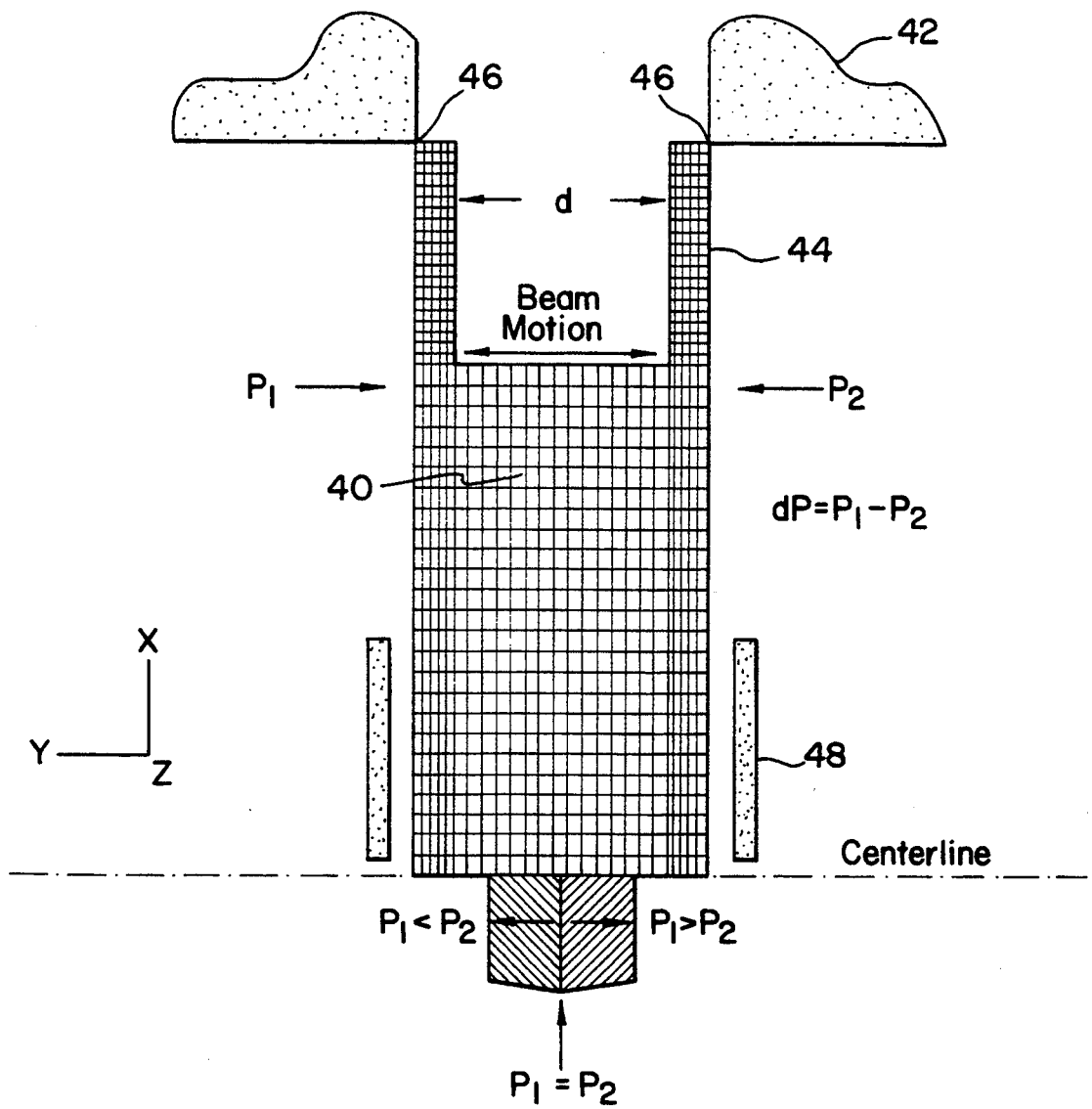
FIG. 4 is a view illustrating an axisymmetric finite element model of a section of FIG. 3.

Finite element stress analysis, as shown in FIG. 4, has been used to optimize a differential fiber optic pressure transducer design. The axisymmetric model of FIG. 4 is based on the embodiment of FIG. 3. This design eliminates fill fluid and all of the problems associated with potential leaks and temperature limitations imposed by these fluids. The present invention uses the rigid beam 40 instead of the fill fluid; and each end of the beam 40 is welded to a flat pressure transfer diaphragm 44, which, in turn, is exposed to hot process fluid such as steam or water. The rigid beam 40 provides ample support to the diaphragms 44 to prevent them from rupturing.

As shown in FIG. 3, each diaphragm 44 is welded around its circumferences to the rigid housing 42. The outer surfaces or wetted sides of the diaphragms are protected from over-travel and rupture by hard stops 48. The stops 48 are located approximately 0.001 inch from each diaphragm 44 in order to limit excessive diaphragm stress during over-travel.

Figure 5:
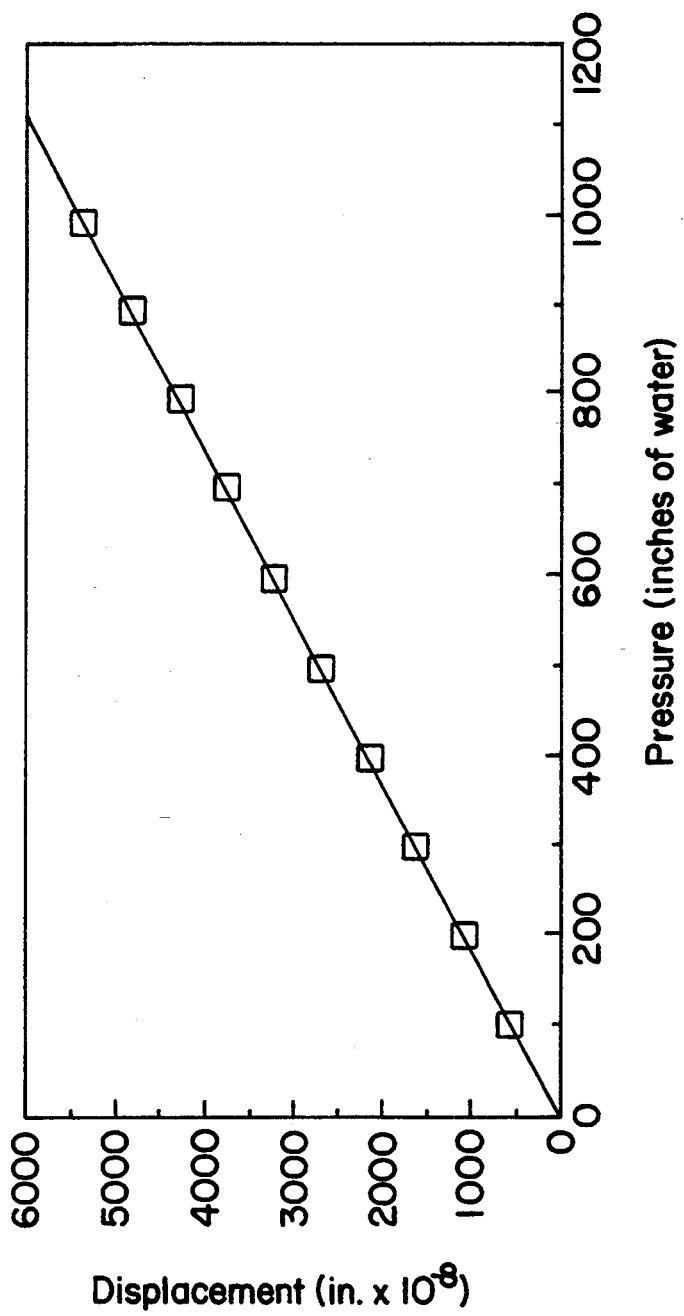
FIG. 5 is a graph plotting axial beam displacement versus pressure for the present invention.

When a small pressure difference exists between the diaphragms 44, both diaphragms 44 deflect toward the low pressure side. This deflection results in motion of the beam 40 from its neutral position (dP=0). Measurement of the axial displacement of the beam provides a direct measure of differential pressure, dP, as shown in the plot in FIG. 5. This plot is based on the modeling analysis illustrated in FIG. 4. The dimensional parameters of one of the embodiment of the present invention are illustrated in Table 1 shown below. Note that without a sensitive low noise sensor, such as a microbend fiber optic sensor, to measure small displacements, measurement of such small axial beam motion would not be possible.

TABLE 1

Design Summary for Beam-style Differential Pressure Transducer
Material: Inconel Alloy 718

| | |
|---|---|
| Beam Diameter | 1.4 inch |
| Beam Length | 0.3 inch |
| Diaphragm Diameter | 2.0 inches |
| Diaphragm Thickness | 0.056 inch |
| Maximum Diaphragm Stress at 1500° F. | 50 ksi |
| dP Range | 0 to 1000 in $H_2O$ |
| Resolution | 1 in $H_2O$ |
| Pressure (inches of $H_2O$) | Beam Displacement (inches) |
| 1 | $5.420 \times 10^{-8}$ |
| 100 | $5.350 \times 10^{-6}$ |
| 200 | $1.0699 \times 10^{-5}$ |
| 300 | $1.6050 \times 10^{-5}$ |
| 400 | $2.1398 \times 10^{-5}$ |
| 500 | $2.6750 \times 10^{-5}$ |
| 600 | $3.2098 \times 10^{-5}$ |
| 700 | $3.7449 \times 10^{-5}$ |
| 800 | $4.2799 \times 10^{-5}$ |
| 900 | $4.8147 \times 10^{-5}$ |
| 1000 | $5.3497 \times 10^{-5}$ |

A time domain referencing embodiment is depicted in FIG. 10. A time domain sensor is described in U.S. Pat. No. 5,196,694. The present invention utilizes those features as well as others herein described. FIG. 10 illustrates a sensing system used in conjunction with the present invention and comprises a signal processor 60 comprising a light source 4 and a detector 6. An optical fiber 2 communicates with the signal processor 60. The fiber 2 is connected at various points by connectors 8 and also communicates with a sensor/transducer head assembly 65. The assembly 65 comprises a 2×2 splitter 38 which leads to a pressure sensor 21 and a reference sensor 23. Mirrors 13 are also provided as well as an optical delay 5 used prior to the pressure sensor 21. The fiber 36 returns light to the signal processor. FIGS. 11 and 12 illustrate the transmitted intensity and received intensity respectively for the system of FIG. 10.

Figure 6:
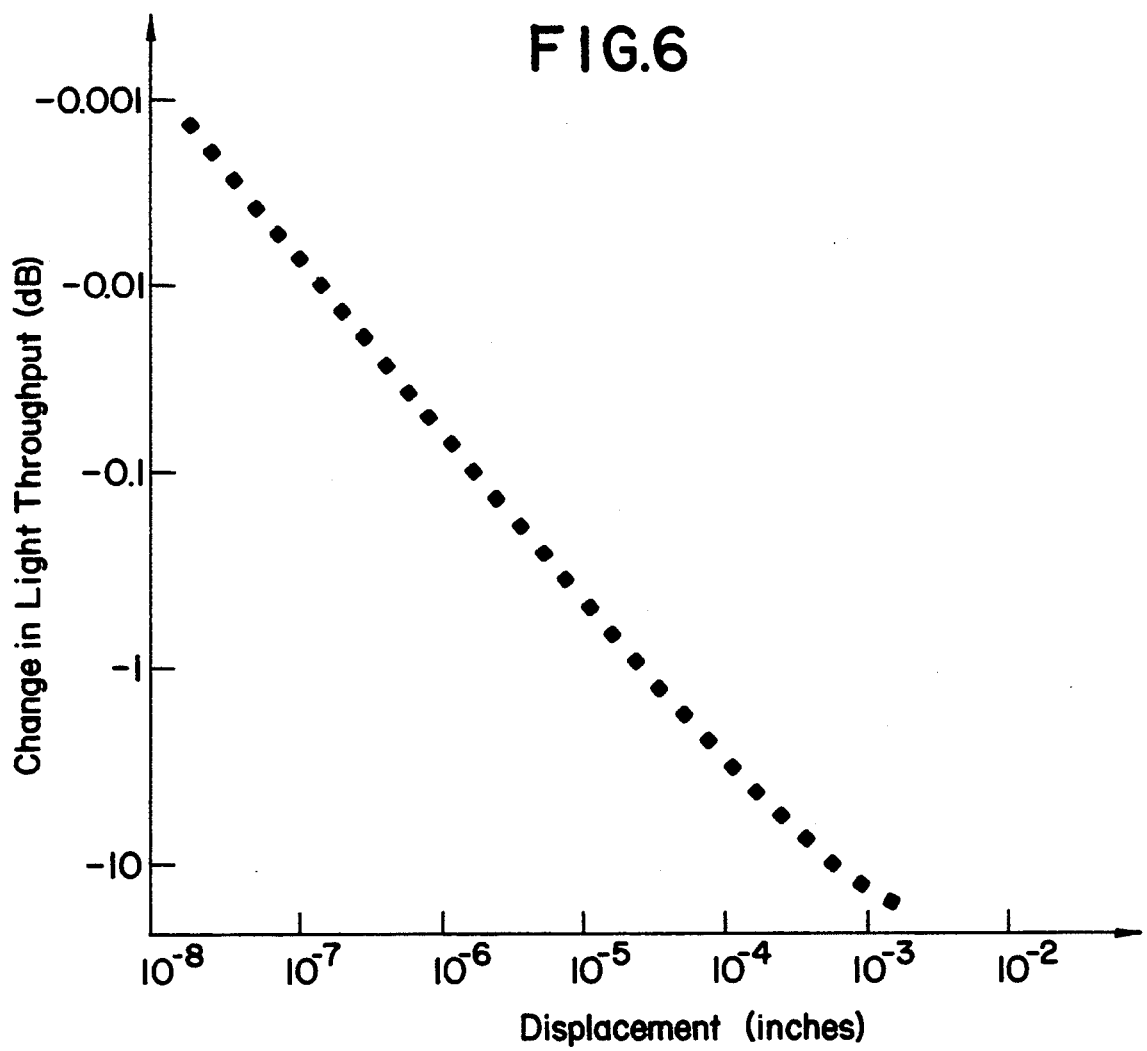
FIG. 6 is a graph plotting pre-loaded microbend sensor light throughput versus displacement of sensors according to the present invention.
Figure 7:
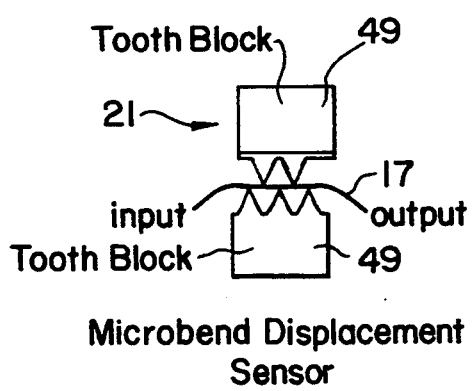
FIG. 7 is a schematic view illustrating a microbend displacement sensor according to the present invention.
Figure 8:
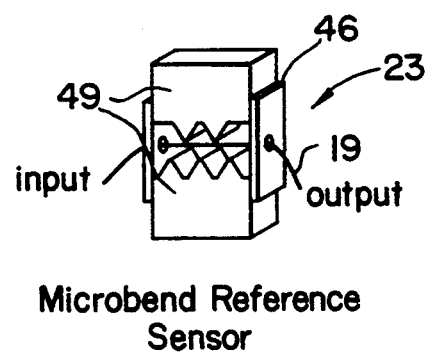
FIG. 8 is a schematic view illustrating a microbend reference sensor according to the present invention.

The present invention uses microbend sensors 21 and 23, shown in FIGS. 7 and 8 respectively, for displacement measurement which is shown in FIG. 6. A multimode step index fiber 17, 19 is clamped between a pair of corrugations 49. FIG. 7 shows a first tooth block 49 that can move and a second tooth block 49 positioned on a fixed reference surface. When the first tooth block moves, the fiber 17, is spatially deformed into a sinusoidal shape. The deformation induced loss in the fiber 17, is proportional to the displacement of the first toothblock. Thus, light passing through the fiber 17, is attenuated in proportion. The loss sensitivity may be optimized by matching the sinusoidal deformation period to the difference between the propagation constants of adjacent modes in the optical fiber.

The change in light intensity versus displacement of the microbend sensor corrugated plates 49 or tooth blocks is shown in FIG. 6. Note that the displacement sensitivity is about $10^{-8}$ inch (in a 1 Hz bandwidth) and ranges up to $>10^{-3}$ inch.

Figure 9:
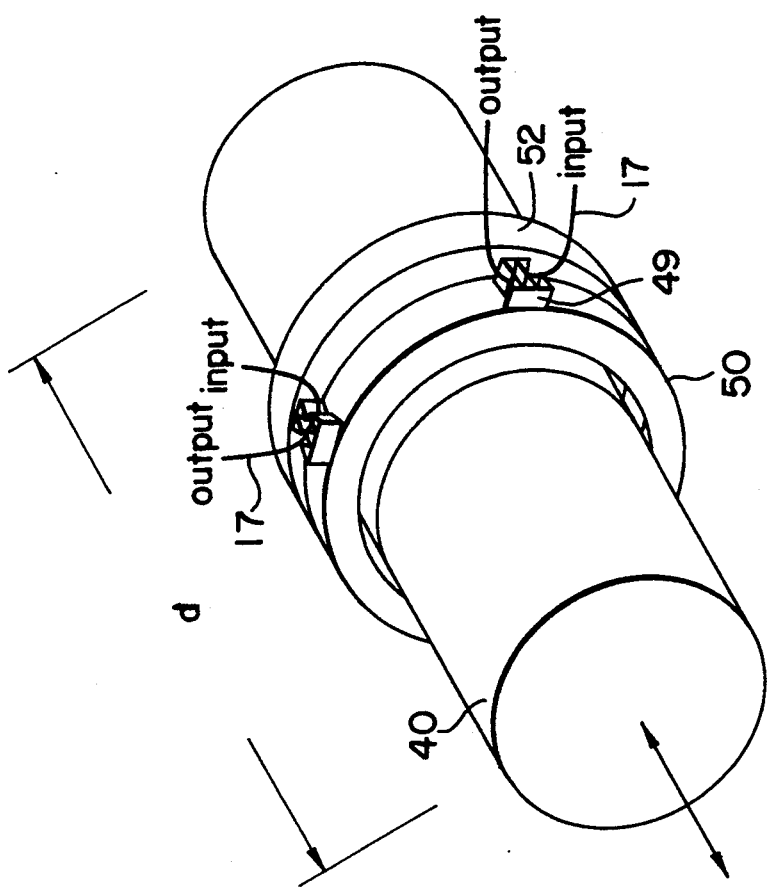
FIG. 9 is a perspective view of the beam of FIG. 3.

FIG. 9 shows one means by which microbend sensors can be used to measure displacement in the middle of the beam 40. An annular or motion ring 52 is fixedly attached around the circumference in the middle of beam 40. Microbend corrugations 49 may be machined into the motion ring 52, which travels with the beam 40. Adjacent to the motion ring 52 is an annular, rigid reference ring 50, which is attached to the dP housing. The ring reference 50 also contains machined microbend corrugations 49. An optical fiber 17 is clamped between the two rings 50 and 52. Movement of the motion ring 52 with changing dP causes changes in the sinusoidal amplitude of the clamped fiber 17, which in turn changes the magnitude of transmitted light intensity that is measured. Either two or four separate microbend sensors 49 are spaced around the rings 50 and 52 and separated by equal angles. This ensures mechanical balance and provides compensation for structural warping which might occur from thermal nonuniformities. The stiffness of each microbend sensor 49 is ~1000 lb/in. With four parallel microbend sensors, the combined stiffness is 4000 lb/in, which causes negligible resistance to the motion of the dP cell structure with stiffness ~$5 \times 10^7$ lb/in. Thus, the effect of the microbend sensor stiffness on overall performance is negligible.

The microbend sensors in the dP cell configuration need to be self-referenced as shown in FIG. 10. In addition, a microbend sensor sensitive to temperature only, i.e. sensor 23, also shown in FIG. 8, is located in the reference leg of the 2×2 splitter 38 for temperature compensation. With the arrangement shown in FIG. 9, two of the four microbend sensors (180° apart) are isolated from the motion ring 52 to act as temperature references. The other two sensors coupled to the motion ring 52 detect ring motion caused by dP. With this implementation, only two 2×2 splitters 38 and four fiber optic delay coils 5 (one for each sensor, FIG. 10) are needed for each dP cell assembly.

Figure 13:
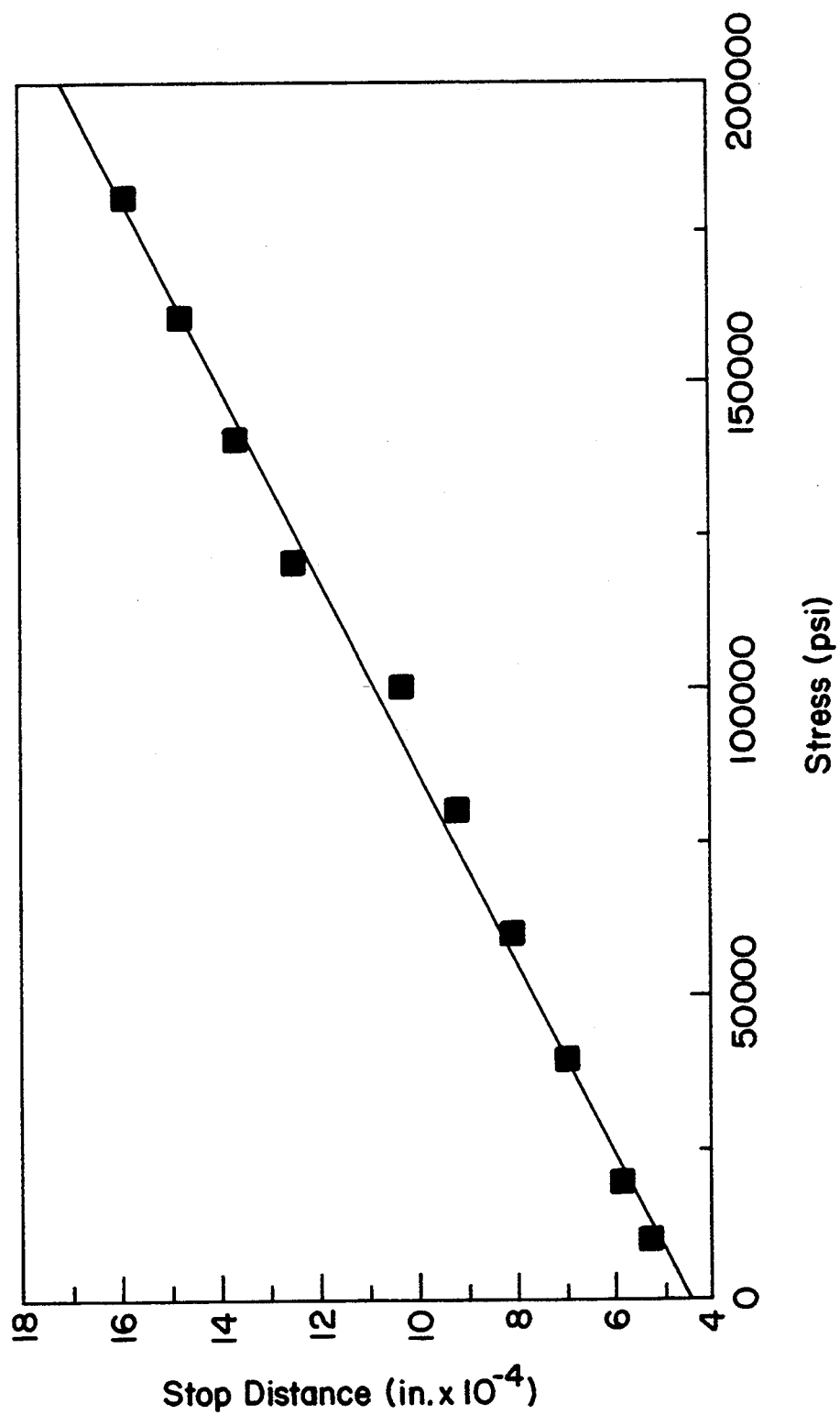
FIG. 13 is a graph plotting the maximum stress versus stop distance for the present invention.

In order to minimize stress caused by overpressure, the diaphragm stops 48, shown in FIG. 3, are positioned precisely. FIG. 13 shows the dependence of diaphragm stress versus distance of stop from diaphragm. In order to maintain the stress below 120 ksi, the stop 48 must be located $(1 \pm 0.1) \times 10^{-3}$ inches from the diaphragm 44.

Multiple microbend sensors positioned along one continuous fiber passing through multiple tooth block assemblies can be arranged around the motion ring 52 and reference ring 50 in order to improve sensitivity. For example, one optical fiber and ten tooth block assemblies with three corrugations per assembly provides a ten times sensitivity enhancement compared to one tooth block assembly and one fiber. Since the spring rate of each tooth block assembly is about 1000 lb/inch, ten assemblies in parallel gives a total spring rate of 10,000 lb/in. This spring rate is still much less than the stiffness of the dual diaphragm assembly.

The beam 40 and diaphragm 44 material can be Inconel alloy 718 with a yield strength of 90,000 psi at 1500° F. Maximum stress for the configuration shown is 50,000 psi. With a measurement range of 1000 in. $H_2O$, a change of 1 in. $H_2O$ corresponds to an axial beam displacement of $5 \times 10^{-8}$ inch, which is the resolution of the microbend sensor. From an accuracy standpoint, it is desirable to have the minimum displacement be ~10 times the measurement resolution. Thus, it is desirable to increase the motion of the beam a factor of 10 without adversely affecting performance.

Beam motion can be increased by adding one or two convolutions to each diaphragm in the annulus between the seal weld and edge of the beam 40. These convolutions can be added without decreasing diaphragm thickness, and without producing undesirable excessive stress, at the expense of adding some non-linearity to the displacement vs dP characteristic shown in FIG. 5. Such non-linearity is acceptable as long as the response characteristic is monotonic and can be calibrated out in signal processing with a suitable curve fit equation programmed into a microprocessor. However, it is important to note that even with the flat diaphragm design shown in FIG. 3, dP measurements can be made with microbend sensors to 1% accuracy.

Specific embodiments of the invention have been shown and described in detail to illustrate the application of the principles of the invention, it will be understood that the invention may be embodied otherwise without departing from such principles.

What is claimed is:

1. A differential pressure transducer that eliminates use of fill fluid, comprising:
   a housing;
   a pair of spaced diaphragms, each diaphragm being connected around a circumference, each to a portion of the housing, the diaphragms having an outer surface and an inner surface, the outer surface of each diaphragm being exposed to a pressure;
   a single beam connected to the diaphragms at the inner surfaces of the diaphragms for mechanically coupling the diaphragms and reacting to pressure forces, said single beam being constructed to support the diaphragms to prevent them from rupturing;

a pair of diaphragm stops positioned in the housing, one diaphragm stop near each of the outer surfaces of each diaphragm to prevent over-travel and rupture of the diaphragm;

sensing means positioned on the beam for sensing beam displacement in response to changes in differential pressure; and signal processor means in communication with said sensing means for providing differential pressure indicating signals based on beam displacement.

2. The transducer according to claim 1, including seal means at each edge of the diaphragm for sealing and connecting the diaphragms to the housing.

3. The transducer according to claim 2, wherein the seal means comprises a weld.

4. The transducer according to claim 1, wherein the diaphragms comprise a deformable material.

5. The transducer according to claim 4, wherein the diaphragms are circular-shaped.

6. The transducer according to claim 1, wherein the beam comprises a rigid material.

7. The transducer according to claim 6, wherein the length of the beam is approximately 0.3 inches.

8. The transducer according to claim 1, wherein the beam is connected to the center of each diaphragm.

9. The transducer according to claim 1, wherein the sensing means comprises a displacement sensor and a reference sensor.

10. The transducer according to claim 9, wherein the displacement sensor and the reference sensor comprise compression means.

11. The transducer according to claim 9, wherein the sensing means further comprises an optical fiber communication with the signal processor means and the compression means of the pressure sensor and the reference sensor, the optical fiber being compressible by the compression means.

12. The transducer according to claim 11, wherein the compression means comprises a plurality of teeth.

13. The transducer according to claim 12, wherein the teeth are movable.

* * * * *